(12) United States Patent
Tam et al.

(10) Patent No.: US 7,796,844 B2
(45) Date of Patent: Sep. 14, 2010

(54) TEMPERATURE-COMPENSATED FIBRE OPTIC STRAIN GAUGE

(75) Inventors: Hwa Ywa Tam, Kowloon (HK); Siu Lau Ho, Kowloon (HK); Shun Yee Liu, Kowloon (HK); Kang Kuen Lee, Kowloon Bay (HK); Tony Kar Yun Lee, Kowloon Bay (HK); Chun Cheong Hon, Kowloon Bay (HK); Hing Keung Chan, Kowloon Bay (HK); Aiken Yiu Ming Tam, Kowloon Bay (HK)

(73) Assignees: The Hong Kong Polytechnic University, Hong Kong (CN); Mass Transit Railway Corporation Limited, Hong Kong (CN)

( * ) Notice: Subject to any disclaimer, the term of this patent is extended or adjusted under 35 U.S.C. 154(b) by 115 days.

(21) Appl. No.: 12/177,830

(22) Filed: Jul. 22, 2008

(65) Prior Publication Data

US 2010/0021106 A1 Jan. 28, 2010

(51) Int. Cl.
G02B 6/00 (2006.01)
(52) U.S. Cl. .......................................... 385/13; 385/37
(58) Field of Classification Search ................... 385/37, 385/13
See application file for complete search history.

(56) References Cited

U.S. PATENT DOCUMENTS

| 7,174,061 B2* | 2/2007 | Rougeault et al. ............. 385/13 |
| 2004/0114850 A1* | 6/2004 | Dewyntermarty et al. ..... 385/13 |
| 2006/0153490 A1* | 7/2006 | Araujo et al. .................. 385/13 |
| 2007/0193362 A1 | 8/2007 | Ferguson |

FOREIGN PATENT DOCUMENTS

JP 2000-162444 A 6/2000

OTHER PUBLICATIONS

International Search Report of International Application No. PCT/CN2009/072865, Oct 15, 2009.

* cited by examiner

*Primary Examiner*—Ellen Kim
(74) *Attorney, Agent, or Firm*—George C. Wang; Wilkinson & Grist (57) ABSTRACT

A temperature-compensated fibet optic strain gauge (10) for measuring strain of a host structure (5), the strain gauge (10) comprising: a mount (20) having a void (19) separating a first section (17) from a second section (18); a first fiber Bragg grating (FBG) (30); a second fiber Bragg grating (FBG) (40); and removable bridging portions (24) adjacent to the void (19) to connect the first section (17) to the second section (18), the bridging portions (24) being removed after the mount (20) is operatively attached to the host structure (5); wherein a right-side failure proof feature is provided by detecting whether a reflection wavelength reverts to an original Bragg wavelength of the first FBG (40) to indicate whether the first FBG (40) has broken.

19 Claims, 7 Drawing Sheets

TEMPERATURE-COMPENSATED FIBRE OPTIC STRAIN GAUGE

TECHNICAL FIELD

The invention concerns a temperature-compensated fiber optic strain gauge for measuring strain of a host structure.

BACKGROUND OF THE INVENTION

A fiber optic strain gauge is typically attached to a host structure to measure the strain of or vibration experienced by the host structure. The strain or vibration of the host structure is transferred to the fiber Bragg grating (FBG) attached to a profiled or etched metal mount. FBGs are structures recorded within a core of an optical fiber. The structure of an FBG causes light of a specific wavelength, known as the Bragg wavelength, to be reflected within the fiber. Both the pitch ($\Lambda$) and effective refractive index ($n_{eff}$) of the structure and consequently, the Bragg wavelength (given by $2n_{eff}\Lambda$), are sensitive to strain and temperature in a highly repetitive manner. Therefore, a FBG is an excellent fiber optic sensor. The strain or temperature of the FBG is encoded in the Bragg wavelength which may be measured using an optical interrogator.

An accurate strain gauge that is also reliable is highly desirable.

SUMMARY OF THE INVENTION

In a first preferred aspect, there is provided a temperature-compensated fibre optic strain gauge for measuring strain of a host structure, the strain gauge comprising:
  a mount to be operatively attached to the host structure, the mount having a void separating a first section of the mount from a second section of the mount;
  a first fiber Bragg grating (FBG) recorded within a core of an optical fiber to measure strain and temperature, the first FBG being located transverse to the void and a first end portion of the first FBG is operatively attached to the first section of the mount and a second end portion of the first FBG is operatively attached to the second section of the mount, the end portions of the first FOG being pre-strained by an amount larger than a predetermined operational range of the first FBG;
  a second fiber Bragg grating (FBG) recorded within the core of the optical fiber to measure temperature, the temperature measurement of the second FBG being used to eliminate temperature as an influence on the strain measurement of the first FBG, a first end portion of the second FBG is operatively attached to the first FBG and a second end portion of the second FBG is operatively attached to the mount so that the second FBG is free from strain; and
  removable bridging portions adjacent to the void to connect the first section to the second section of the mount, the bridging portions being removed after the mount is operatively attached to the host structure;
  wherein a right-side failure proof feature is provided by detecting whether a reflection wavelength reverts to an original Bragg wavelength of the first FBG to indicate whether the first FBG has broken.

A first bridging portion may be located adjacent to a top longitudinal side of the void and a second bridging portion may be located adjacent to the bottom longitudinal side of the void.

The bridging portions may be removed by cutting from the mount using a cutting plier or by punching using a cut die.

The mount may be made from metal.

The metal mount has an upper surface and a lower surface, and the lower surface of the metal mount may be attached to the host structure by spot welding or an adhesive such as epoxy or glue.

The metal mount may have a plurality of apertures to direct excess adhesive from the lower surface of the metal mount to the upper surface of the metal mount so that close contact between the metal mount and the host structure is maintained to maximize the transfer of strain from the host structure to the first FBG.

The upper surface of the metal mount may have recessed pads for spot welding the metal mount to the host structure.

The metal mount may have four recessed pads made by etching or machining the metal mount.

The optical fiber may be a low bending loss optical fiber such as single-mode silica optical fiber satisfying ITU G.657 Table B.

The first FBG may be covered by a waterproof resilient glue such as silicone glue to protect the first FBG from moisture and to dampen the first FBG to avoid sideways oscillations.

The void may be located at a middle portion of the mount.

The strain gauge may further comprise a notch located at a middle portion of each bridging portion to relieve stress developed when the removable bridging portion is being removed.

The strain gauge may further comprise a pair of foldable wings at an end portion of the mount, the wings being folded to cover and secure the optical fiber at the end portion of the mount.

The lower surface of the mount may comprise a recessed path to accommodate the optical fiber and the FBGs such that the optical fiber does not protrude above the tower surface of the mount.

The recessed path may have a curved portion and a narrow straight portion, the curved portion allowing the optical fiber to freely move within the predetermined operational range of the FBGs in response to mechanical strain or thermal strain, and the narrow straight portion ensuring the second FBG is kept straight.

The first and second FBGs may be located at a middle portion of the mount and oriented substantially parallel to each other to reduce the length of optical fiber for the strain gauge.

The second end portion of the second FBG may be attached to an overhang portion of the mount so that it is free from tension.

In a second aspect, there is provided a system for measuring strain of a host structure, the system comprising:
  a mount to be operatively attached to the host structure, the mount having a void separating a first section of the mount from a second section of the mount;
  a first fiber Bragg grating (FBG) recorded within a core of an optical fiber to measure strain and temperature, the first FBG being located transverse to the void and a first end portion of the first FBG is operatively attached to the first section of the mount and a second end portion of the first FBG is operatively attached to the second section of the mount, the end portions of the first FBG being pre-strained by an amount larger than a predetermined operational range of the first FBG;
  a second fiber Bragg grating (FBG) recorded within the core of the optical fiber to measure temperature, the temperature measurement of the second FBG being used to eliminate temperature as an influence on the strain measurement of the first FBG, a first end portion of the second FBG is operatively attached to the first FBG and a second end portion of the second FBG is operatively attached to the mount so that the second FBG is free from strain; and removable bridging portions adjacent to the void to connect the first section to the second section of the mount, the bridging portions being removed after the mount is operatively attached to the host structure;

wherein a right-side failure proof feature is provided by detecting whether a reflection wavelength reverts to an original Bragg wavelength of the first FBG to indicate whether the first FBG has broken.

In a third aspect, there is provided a method for providing a right-side failure proof feature for a temperature-compensated fibre optic strain gauge, the method comprising:

operatively attaching a mount to the host structure, the mount having a void separating a first section of the mount from a second section of the mount;

a pre-straining end portions of a first fiber Bragg grating (FBG) connected to the first and second sections by an amount larger than a predetermined operational range of the first FBG;

operatively attaching a second fiber Bragg grating (FBG) to the first FBG and the mount; and removing bridging portions connecting the first and second sections after the mount is operatively attached to the host structure;

wherein a right-side failure proof feature is provided by detecting whether a reflection wavelength reverts to an original Bragg wavelength of the first FBG to indicate whether the first FBG has broken.

In a fourth aspect, there is provided mount for a temperature-compensated fibre optic strain gauge, the mount comprising:

a void located at a middle portion of the mount to separate the mount into a first section and a second section; and removable bridges to connect the first section to the second section;

wherein after the mount has been operatively attached to a host structure, the removable bridges are removed.

In a fifth aspect, there is provided a temperature sensor for measuring the temperature of a host structure, the temperature sensor comprising:

a mount to be operatively attached to the host structure;

a recessed path defined on a surface of the mount having at least one straight section and at least one curved section;

a fiber Bragg grating (FBG) recorded within a core of an optical fiber to measure temperature, the FBG being located within the straight section of the recessed path to ensure the FBG is kept straight;

wherein the at least one curved section of the recessed path allows limited lateral movement of the optical fiber.

In a sixth aspect, there is provided a mount for a temperature sensor, the mount comprising:

a recessed path defined on a surface of the mount having at least one straight section and at least one curved section;

wherein a fiber Bragg grating (FBG) recorded within a core of an optical fiber to measure temperature is located within the straight section of the recessed path to ensure the FBG is kept straight, and the at least one curved section of the recessed path allows limited lateral movement of the optical fiber.

BRIEF DESCRIPTION OF THE DRAWINGS

An example of the invention will now be described with reference to the accompanying drawings, in which.

DETAILED DESCRIPTION OF THE DRAWINGS

Figure 1:
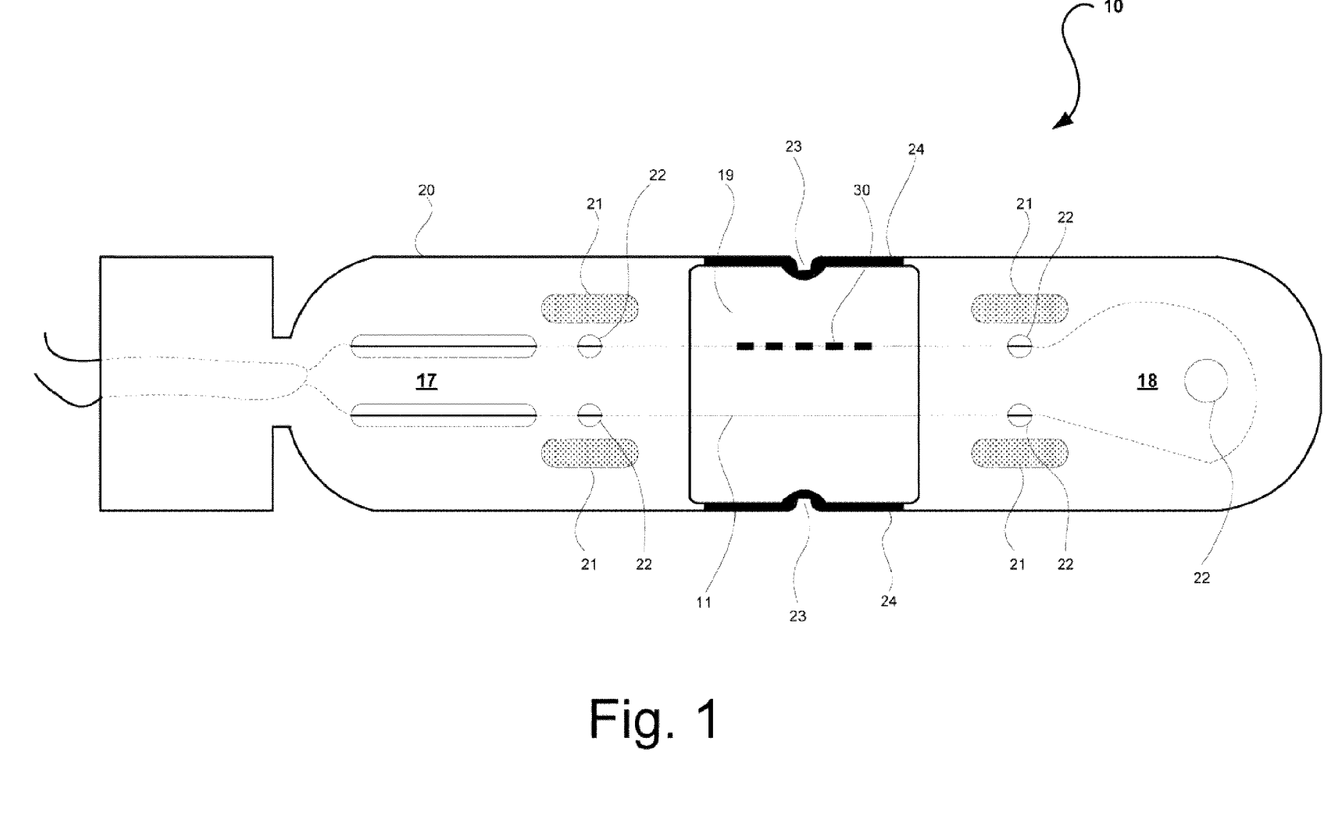
FIG. 1 is a top plan view of a fibre optic strain gauge prior to installation in accordance with a first embodiment of the present invention.
Figure 2:
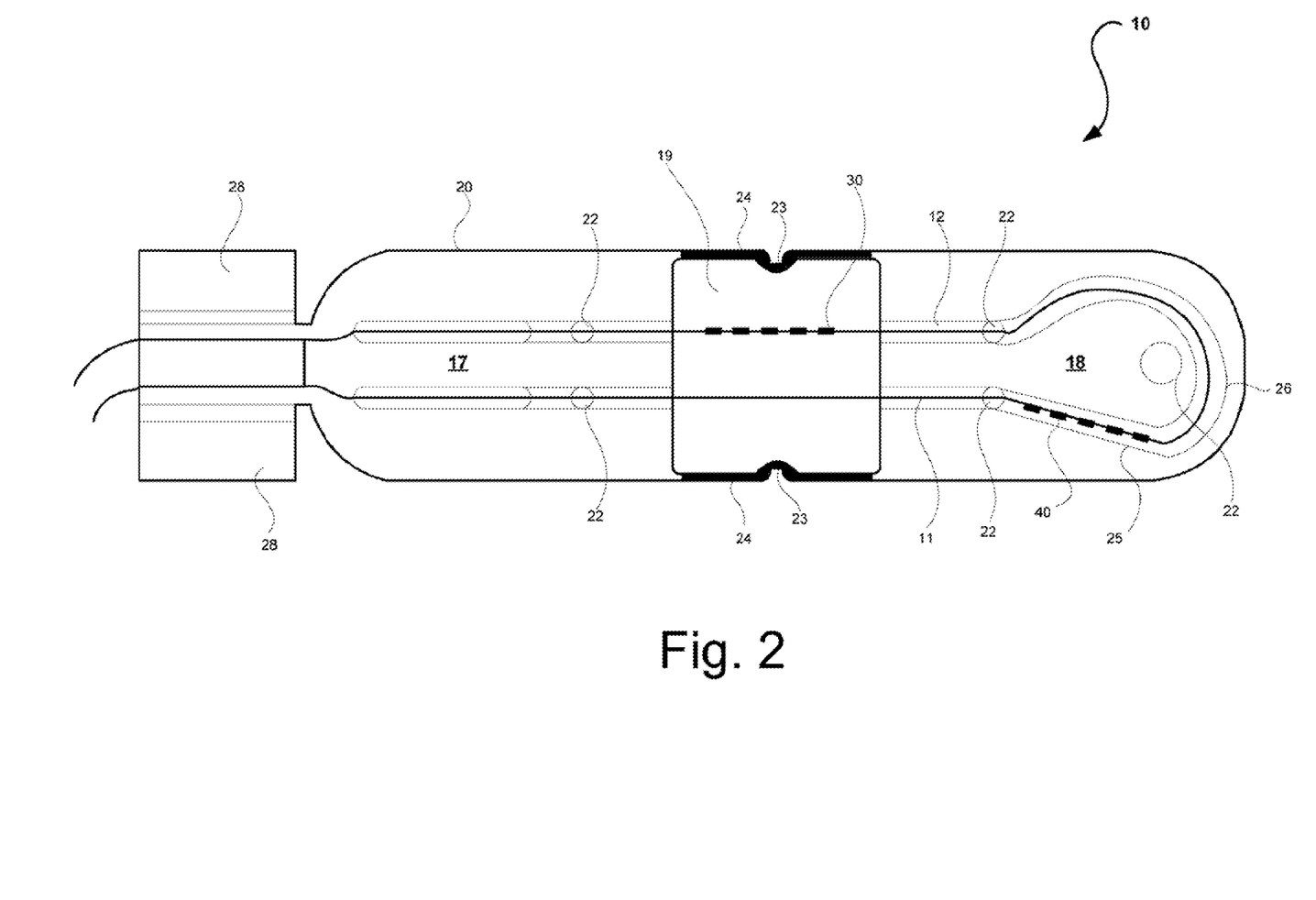
FIG. 2 is a bottom plan view of the strain gauge of FIG. 1 prior to installation.
Figure 3:
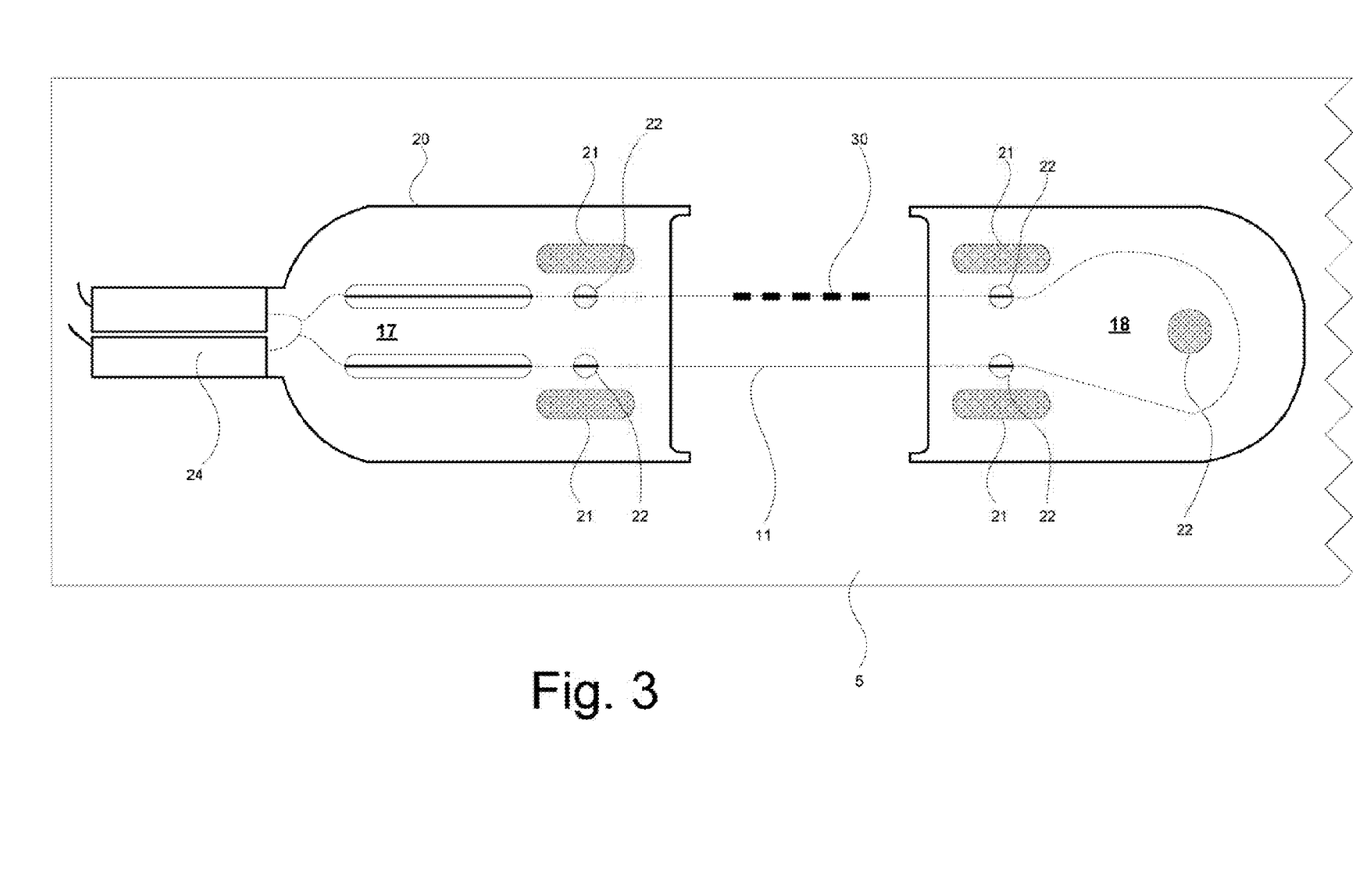
FIG. 3 is a top plan view of a strain gauge of FIG. 1 after installation.

Referring to FIGS. 1 to 3, a temperature-compensated fibre optic strain gauge 10 for measuring strain of a host structure 5 is provided. The host structure 5 may be but not limited to an I-beam or a railway track. The strain gauge 10 generally comprises: a mount 20, a first fiber Bragg grating (FBG) 30, a second fiber Bragg grating (FBG) 40 and removable bridging portions 24. The first fiber Bragg grating 30 and the second fiber Bragg grating 40 may be recoated with a thin-layer of protective coating such as polyimide. The mount 20 is made from metal and is to be operatively attached to the host structure 5 during installation of the strain gauge 10. The mount 20 has a void 19 separating a first section 17 of the mount 20 from a second section 18 of the mount 20. The void 19 is located at a middle portion of the mount 20. The first FBG 30 is recorded within a core of an optical fiber 11 to measure strain and temperature experienced by the host structure 5. Preferably, the optical fiber 11 is a low bending loss optical fiber such as single-mode silica optical fiber satisfying ITU G.657 Table B. The first FBG 30 is located transverse to the void 19. One end of the first FBG 30 is operatively attached to the first section 17 of the mount 20. The other end of the first FBG 30 is operatively attached to the second section 18 of the mount 20. The ends of the first FBG 30 are pre-strained by an amount larger than a predetermined operational range of the first FBG 30 which enables a right-side failure proof feature to be provided. The second FBG 40 is also recorded within the core of the optical fiber 11 to measure temperature. The temperature measurement of the second FBG 40 is used to eliminate temperature as an influence on the strain measurement of the first FBG 30. One end of the second FBG 40 is operatively attached to the first FBG 30. Another end of the second FBG 40 is operatively attached to the mount so that the second FBG 40 is free from strain. The bridging portions 24 are located adjacent to the void 19. The bridging portions 24 connect the first section 17 to the second section 18 of the mount 20. The bridging portions 24 are removed after the mount 20 is operatively attached to the host structure 5 during installation of the strain gauge 10. A right-side failure proof feature is provided by detecting whether a reflection wavelength reverts to an original Bragg wavelength of the first FBG 30 to indicate whether the first FBG 30 has broken.

There are two bridging portions 24. The bridging portions 24 are located adjacent to the top and bottom longitudinal sides of the void 19. The bridging portions 24 are removed by cutting them from the mount 20 using a cutting plier or by punching them out of the mount 20 using a cut die. In the middle of each bridging portion 24, a notch 23 is provided. The notch 23 relieves stress developed when the bridging portion 24 is being removed.

The mount 20 has an upper surface and a lower surface. The lower surface of the mount 20 is attached to the host structure 5 by spot welding, soldering or an adhesive such as epoxy or glue. The mount 20 has a plurality of apertures 22 to direct excess amounts of adhesive from the lower surface of the mount 20 to the upper surface of the mount 20. This ensures that close contact between the mount 20 and the host structure 5 is maintained to maximize the transfer of strain from the host structure 5 to the first FBG 30 for measurement. The upper surface of the mount 20 has four recessed pads 21 for spot welding the mount 20 to the host structure 5. The recessed pads 21 are made by etching or machining the mount 20. A pair of foldable wings 28 is provided at the cable-end of the mount 20. The wings 28 are folded to cover and secure the optical fiber 11 at the cable-end of the mount 20 during installation. The lower surface of the mount 20 comprises a recessed path 12. The recessed path 12 accommodates the optical fiber 11 and the FBGs 30, 40. This ensures the optical fiber 11 is held in the recessed path 12 and does not protrude above the lower surface of the mount 20. The recessed path 12 has a curved portion 26 and a narrow straight portion 25. The curved portion 26 allows the optical fiber 11 to freely move within the predetermined operational range of the FBGs 30, 40 in response to mechanical strain or thermal strain. The narrow straight portion 25 ensures the second FBG 40 is kept straight.

The first FBG 30 is covered by a waterproof resilient glue such as silicone glue to protect the first FBG 30 from moisture. The glue also dampens the first FBG 30 to avoid sideways oscillations.

Figure 4:
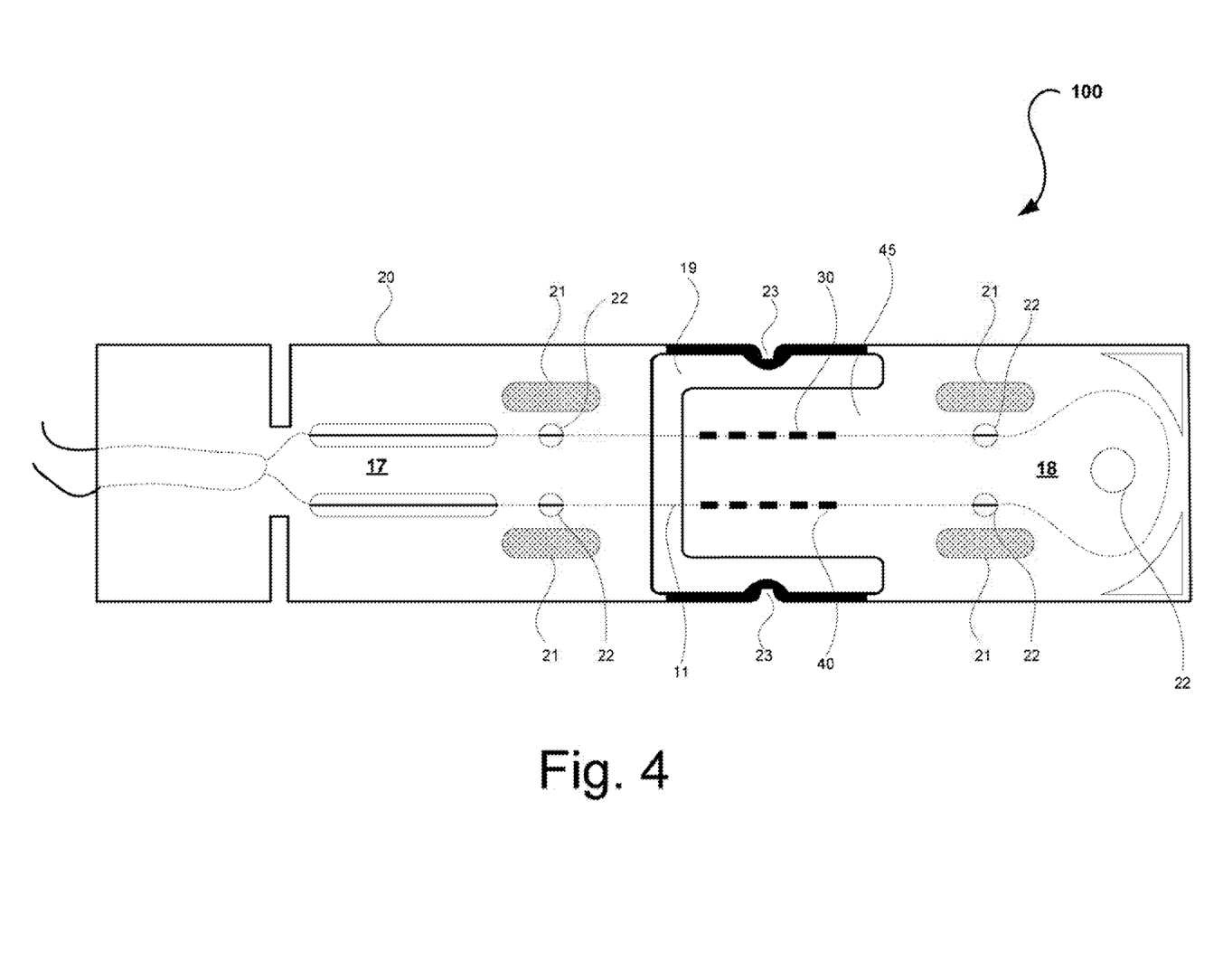
FIG. 4 is top plan view of a strain gauge prior to installation in accordance with a second embodiment of the present invention.
Figure 5:
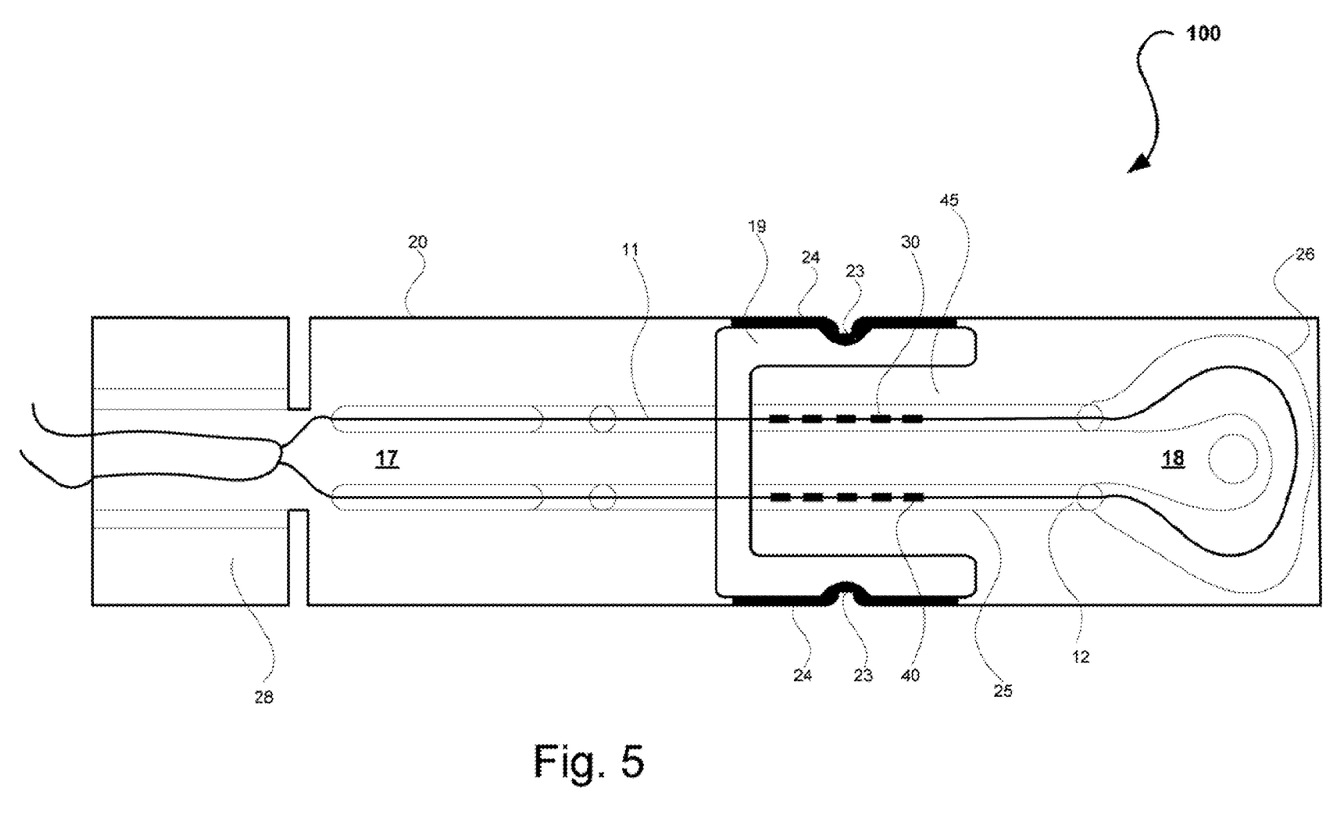
FIG. 5 is a bottom plan view of the strain gauge of FIG. 4 prior to installation.
Figure 6:
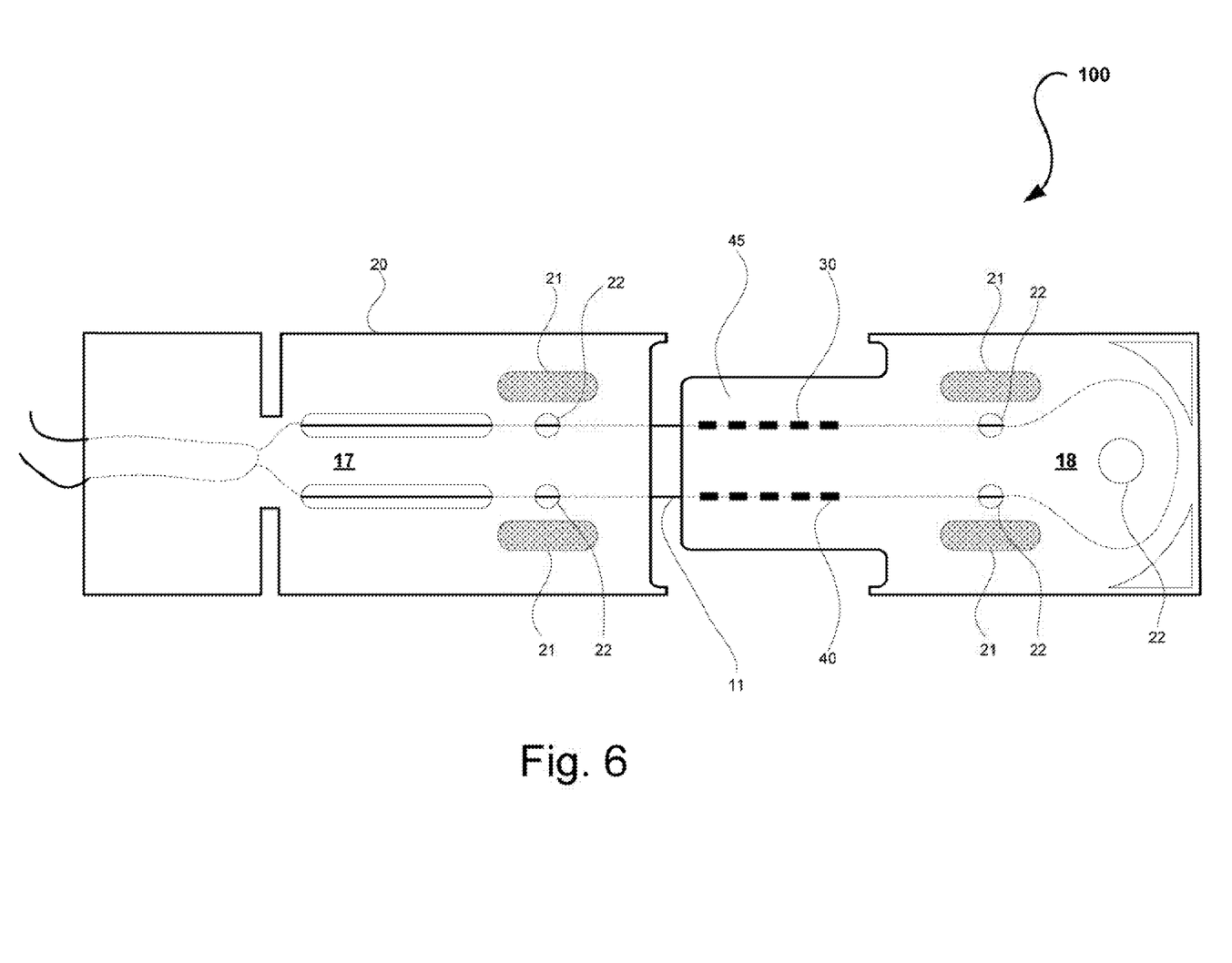
FIG. 6 is a top plan view of a strain gauge of FIG. 3 after installation.

Referring to FIGS. 4 to 6, in another embodiment, a second strain gauge 100 is provided. The second strain gauge 100 differs from the first strain gauge 10 described because the first and second FBGs 30, 40 are located at a middle portion of the mount 20. The first and second FBGs 30, 40 are oriented substantially parallel to each other to reduce the length of optical fiber 11 required for the strain gauge 10. This enables a shorter fiber-optics strain gauge 100 to be provided. The second end of the second FBG 40 is attached to an overhang portion of the mount 20 so that it is free from tension. The second FBG 40 is kept straight but tension-free by an overhang part 45 of the mount 20. There is also a recessed path 12 on the lower side of the mount 20 to accommodate and protect the two FBGs 30, 40 and the optical fiber 11.

The reason for pre-straining the first FBG 30 when it is attached to the metal mount is because it prevents the first FBG 30 from sagging when the strain gauge 10 experiences negative strain or stress. The first FBG 30 must be pre-strained by an amount much larger than the normal operating range of the sensor. For example, if the operating range of the FBG is ±1,000 microstrain, then the first FBG 30 must be pre-strained to greater than ±1,000 microstrain. The first FBG 30 is connected to the second FBG 40 via a curved path in the mount 20. This connection arrangement allows the first FBG 30 to be connected at one end only and thus simplify the installation process. Having both ends of the optical fiber 11 connected on the same side permits the first FBG 30 to be used in tight corners or small areas. The second FBG 40 is attached to the mount 20 at one end only. The other end of the second FBG 40 is not attached to the mount. This connection arrangement frees the second FBG 40 from any mechanical strain and thus will only respond to temperature changes. The two FBGs 30, 40 are in close proximity to each other and therefore assumed to be subjected to the same temperature. Knowing the temperature from the second FBG 40, one can remove its influence to the strain/vibration measurement obtained by the first FBG 30. By comparing the measurement from the first FBG 30 to the second FBG 40, the strain gauge 10 functions as a temperature-compensated strain gauge or temperature-compensated vibration sensor.

A change in strain or stress alters the center of the wavelength of the light reflected from the first FBG 30. A change in temperature alters the center of the wavelength of the light reflected from the first FBG 30 and the second FBG 40. Strain and temperature directly affect the period of the index modulation ($\Lambda$) and the effective index of refraction (n). Therefore, any change in strain and temperature directly affects the Bragg wavelength.

The mount 20 is made from profiled metal and is etched or machined with a recessed path 12 on the lower side of the mount 20. The recessed path 12 accommodates the optical fiber 11 and the two FBGs 30, 40. This enables the optical fiber 11 to be held in the recessed path 12 below the surface of the lower side of the mount 20. In particular, the curved part 26 of the recessed path 20 allows the optical fiber 11 to move freely within the specified operational range of the second FBG 40 such that mechanical strain and thermal strain of the mount 20 is not transferred to the second FBG 40. The straight part 25 of the recessed path 12 is narrow and straight to keep the second FBG 40 straight.

The upper side of the mount 20 is etched or machined with recessed pads 21. During installation, the lower side of the mount 20 having the optical fiber 11 is made to face the host structure 5. The strain gauge 10 is welded to the host structure 5 by spot welding at the location of the recessed pads 21. Alternatively, epoxy glue is used to adhere the strain gauge 10 to the host structure 5. The through-holes 22 on the mount 20 direct excess epoxy from the lower side to the upper side in order to keep the epoxy layer even and as thin as possible. This enables close contact between the strain gauge 10 and the host structure 5 to be maintained and thus maximize the transfer of strain from the host structure 5 to the strain gauge 10.

At the cable-end of the mount 20, there are two foldable wings 28. The two wings 28 fold over the optical fiber cable 11 over the upper side of the mount 20. This secures the optical fiber cable 11 to the mount 20. At the middle portion of the mount 20, there are two bridges 24 which prevent deformation of the metal mount 20. After the strain gauge 10 is firmly attached onto the host structure 5, the two bridges 24 are removed such that the middle portion of the first FBG 30 is only supported by the host structure 5 but not by the mount 20. The removal of the bridges 24 may be performed by cutting the bridges 24.

A right-side failure proof feature is provided by the strain gauge 10. This is very important for safety-critical applications such as railways. If the strain gauge 10 is accidentally detached from the host structure 5, for example, the FBG 30 breaks, or an unusually large strain change is observed, the large strain change brings the reflection wavelength back to the un-prestrained or not-allowable wavelength of the first FBG 30. The not-allowable wavelength is the original Bragg wavelength of the first FBG 30 before it is attached to the mount 20. The Bragg wavelength of the first FBG 30 shifts to a longer wavelength after it is attached onto the mount 20 and does not return to its original value during operation. The Bragg wavelength of the first FBG 30 will only return to its original wavelength when it is not under any tension. The detection of this condition infers that the first FBG 30 is broken or the fiber-optic strain gauge is completely or partly detached from the host structure 5. The detection of this condition is possible because the first FBG 30 is pre-strained to an amount greater than the operation measurement range of first FBG 30. After installation when the bridges 24 are removed or cut, when one or both sides of the metal mount 2 are detached from the host structure 5, the first FBG 30 will break or lose tension. A detached or damaged strain gauge 10 is detectable.

After removing the bridges 24, the first FBG 30 and the returning optical fiber 11 are covered with a waterproof resilient glue. For example, a silicone glue may be used. The glue protects the first and second FBGs 30, 40 from moisture and also dampens the tensioned FBGs 30, 40 to avoid any sideway oscillations.

The strain gauge 10 may be used to measure strain and stress or vibration of a structure. It is particularly useful when the environment for the installation of the strain gauge 10 is not suitable for conventional electrical strain gauges. These environments include high electromagnetic radiation field, for example, motor and power transmission lines/towers, flammable gas/liquid with ignition risk, or presence of corrosive substances. More importantly, the strain gauge 10 provides a right-side failure feature to permit it to be used in applications which must be failsafe. In other words, a non-functioning strain gauge 10 must identify itself proactively as being not functional. For example such applications include railway applications that need to comply with the Safety Level-Four standard.

The strain gauges 10, 100 provide the following four advantages when compared to conventional electrical strain gauges: EMI immunity, long sensing distance, simple sensor configuration, and no risk of ignition. Only an optical signal is transmitted inside fiber optical strain gauge which is immune to electromagnetic interference (EMI). Long sensing distance is achieved by using low loss telecommunication grade single mode silica optical fiber to connect and to fabricate fiber optical strain gauges. Tens or even hundreds of fiber optical strain gauges may be connected in series along a single optical fiber. In contrast, every single electrical strain gauge must be connected with at least one pair of electrical cable. Thus, the networking topology and installation of fiber optical strain gauges is superior to electrical strain gauges. Fiber optical strain gauges only carry an optical signal which has no risk of arcing and fire causing. This feature is particular important when the field of installation has explosion or fire hazard, such as chemical plants and oil wells.

The strain gauge 10 offers several important features not found in other existing fiber optical strain gauges. By using a low bending loss optical fiber inside the strain gauge package both the incoming and outgoing optical fibers can be from one side of the strain gauge package. The feature enable the strain gauge 10 could be used in space limited location (for example, a tight corner or a dead end) at which installing a return cable is difficult or impossible.

By packing a second FBG 40 that is temperature-sensing inside the same package as the first FBG 30 that is strain sensing the entire strain gauge 10 can be used as a temperature-compensated fiber optical strain gauge.

The right-side failure feature of the strain gauge 10 enables it to be used in safety critical applications. Without a right-side failure feature, an unnoticed sensor failure is likely to cause serious problems or even endanger lives.

In some applications where environmental factors such as wind and vibration are prominent, the incorporation of low bending loss G657 table B optical fiber achieves an optical power level and strain gauge signal stability. Train and railways, vehicles, airplanes and bridges are some of the applications.

Low bending-loss connection optical fibers/cables are less susceptible to unwanted vibration. Low bending-loss fibers/cables compatible for the FBGs 30, 40 may be used to connect a series of fiber-optics strain gauges 10 together with low connection loss. The low bending-loss fibers are much less susceptible to external perturbations such as vibrations. This feature is very critical in applications where the strain gauges 10 are installed in moving objects, such as trains, where excessive vibration or temperature variations could introduce small bends to the connection fibers/cables, causing occasional large optical losses that render the optical signal too small to be read by the system.

The use of resilient glue to dampen the sideway oscillation of the FBG 30 is also an important feature as this oscillation could introduce unwanted wavelength shift that would corrupt strain or longitudinal vibration measurements of the strain gauge 10.

The influence of mount 20 to the FBGs 30, 40 is eliminated. The design of the strain gauge 10 removes the influence of the mount 20 on the FBGs 30, 40 during strain measurement. The cutting away of the two bridges 24 the strain gauge 10 eliminates the transfer of temperature effect on the mount 20 to the FBGs 30, 40. At the same time, the design also eliminates the effect of epoxy/glue (if used) in temperature measurement.

The thermal expansion of the mount 20 is not transferred to the FBG 40 and therefore substantially less spectrum needs to be allocated to FBG 40 for temperature measurement over a given temperature range. For example, the temperature coefficient of an FBG is typically about 10 pm/° C. and that of a conventional packaged FBG is about 30-40 pm/° C. Consequently, FBG interrogators can handle 3-4 times more FBG temperature sensors along a single fiber using the strain gauge 10.

In contrast to conventional FBG installation approaches, the strain gauge 10 does not require the entire length of FBG 30, 40 to be epoxied or glued onto the host structure 5. This eliminates spectral broadening of the FBGs 30, 40 during installation. This may be due to a number of factors including: surface unevenness of structure 5 and introducing measurement errors. This also simplifies the installation process because the strain gauge 10 does not require a highly polished surface for installation.

Figure 7:
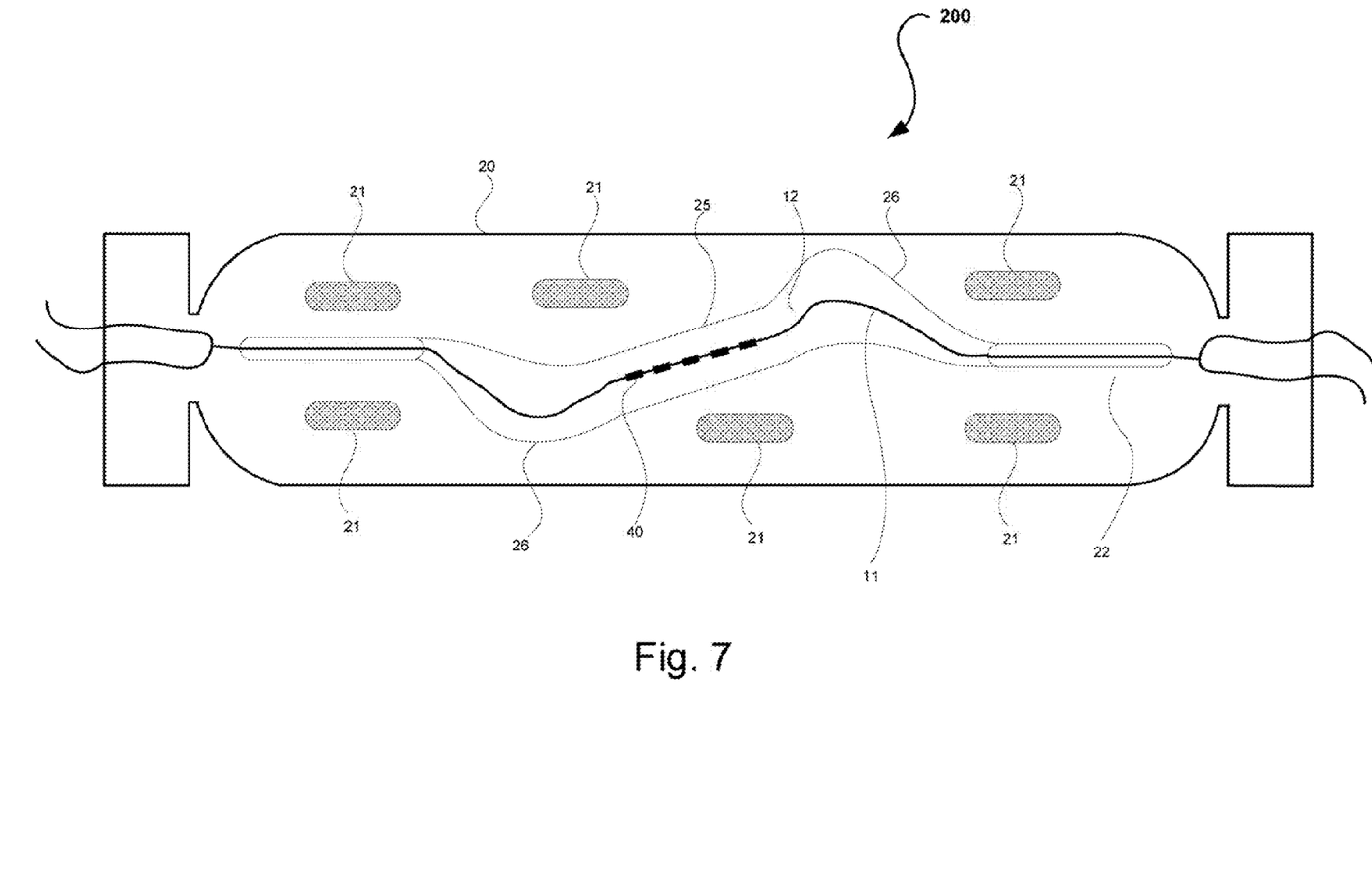
FIG. 7 is a top plan view of temperature sensor in accordance with a third embodiment of the present invention.

Referring to FIG. 7, a temperature sensor 200 for measuring the temperature of a host structure is provided. Similar to the previous embodiments, the temperature sensor 200 comprises a mount 20 to be operatively attached to the host structure and a recessed path 12 defined on a surface of the mount 20. The recessed path 12 has at least one straight section 25 for placement of a fiber Bragg grating (FBG) 40 for measuring temperature. The straight section 25 ensures the FBG 40 is kept straight. The recessed path 12 also has several curved sections 26 which allow limited lateral movement of the optical fiber 11. The curved sections 26 have a wider width than the straight section so that there is more space to accommodate the movement of the optical fiber 11 when the temperature sensor 200 is in use.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:

1. A temperature-compensated fibre optic strain gauge for measuring strain of a host structure, the strain gauge comprising:
   a mount to be operatively attached to the host structure, the mount having a void separating a first section of the mount from a second section of the mount;
   a first fiber Bragg grating (FBG) recorded within a core of an optical fiber to measure strain and temperature, the first FBG being located transverse to the void and a first end portion of the first FBG is operatively attached to the first section of the mount and a second end portion of the first FBG is operatively attached to the second section of the mount, the end portions of the first FBG being pre-strained by an amount larger than a predetermined operational range of the first FBG;
   a second fiber Bragg grating (FBG) recorded within the core of the optical fiber to measure temperature, the temperature measurement of the second FBG being used to eliminate temperature as an influence on the strain measurement of the first FBG, a first end portion of the second FBG is operatively attached to the first FBG and a second end portion of the second FBG is operatively attached to the mount so that the second FBG is free from strain; and
   removable bridging portions adjacent to the void to connect the first section to the second section of the mount, the bridging portions being removed after the mount is operatively attached to the host structure;
   wherein a right-side failure proof feature is provided by detecting whether a reflection wavelength reverts to an original Bragg wavelength of the first FBG to indicate whether the first FBG has broken.

2. The strain gauge according to claim 1, wherein a first bridging portion is located adjacent to a top longitudinal side of the void and a second bridging portion is located adjacent to the bottom longitudinal side of the void.

3. The strain gauge according to claim 1, wherein the bridging portions are removed by cutting from the mount using a cutting plier or by punching using a cut die.

4. The strain gauge according to claim 1, wherein the mount is made from metal.

5. The strain gauge according to claim 4, wherein the metal mount has an upper surface and a lower surface, and the lower surface of the metal mount is attached to the host structure by spot welding or an adhesive such as epoxy or glue.

6. The strain gauge according to claim 5, wherein the metal mount has a plurality of apertures to direct excess adhesive from the lower surface of the metal mount to the upper surface of the metal mount so that close contact between the metal mount and the host structure is maintained to maximize the transfer of strain from the host structure to the first FBG.

7. The strain gauge according to claim 4, wherein the upper surface of the metal mount has recessed pads for spot welding the metal mount to the host structure.

8. The strain gauge according to claim 7, wherein the metal mount has four recessed pads made by etching or machining the metal mount.

9. The strain gauge according to claim 1, wherein the optical fiber is a low bending loss optical fiber such as single-mode silica optical fiber satisfying ITU G.657 Table B.

10. The strain gauge according to claim 1, further comprising a notch located at a middle portion of each bridging portion to relieve stress developed when the removable bridging portion is being removed.

11. The strain gauge according to claim 1, further comprising a pair of foldable wings at an end portion of the mount the wings being folded to cover and secure the optical fiber at the end portion of the mount.

12. The strain gauge according to claim 1, wherein the lower surface of the mount comprises a recessed path to accommodate the optical fiber and the FBGs such that the optical fiber does not protrude above the lower surface of the mount.

13. The strain gauge according to claim 12, wherein the recessed path has a curved portion and a narrow straight portion, the curved portion allowing the optical fiber to freely move within the predetermined operational range of the FBGs in response to mechanical strain or thermal strain, and the narrow straight portion ensuring the second FBG is kept straight.

14. The strain gauge according to claim 1, wherein the first and second FBGs are located at a middle portion of the mount and oriented substantially parallel to each other to reduce the length of optical fiber for the strain gauge.

15. The strain gauge according to claim 1, wherein the second end portion of the second FBG is attached to an overhang portion of the mount so that it is free from tension.

16. A system for measuring strain of a host structure, the system comprising:
   a mount to be operatively attached to the host structure, the mount having a void separating a first section of the mount from a second section of the mount;
   a first fiber Bragg grating (FBG) recorded within a core of an optical fiber to measure strain and temperature, the first FBG being located transverse to the void and a first end portion of the first FBG is operatively attached to the first section of the mount and a second end portion of the first FBG is operatively attached to the second section of the mount, the end portions of the first FBG being pre-strained by an amount larger than a predetermined operational range of the first FBG;
   a second fiber Bragg grating (FBG) recorded within the core of the optical fiber to measure temperature, the temperature measurement of the second FBG being used to eliminate temperature as an influence on the strain measurement of the first FBG, a first end portion of the second FBG is operatively attached to the first FBG and a second end portion of the second FBG is operatively attached to the mount so that the second FBG is free from strain; and
   removable bridging portions adjacent to the void to connect the first section to the second section of the mount, the bridging portions being removed after the mount is operatively attached to the host structure;
   wherein a right-side failure proof feature is provided by detecting whether a reflection wavelength reverts to an original Bragg wavelength of the first FBG to indicate whether the first FBG has broken.

17. A method for providing a right-side failure proof feature for a temperature-compensated fibre optic strain gauge, the method comprising:
   operatively attaching a mount to the host structure, the mount having a void separating a first section of the mount from a second section of the mount;
   a pre-straining end portions of a first fiber Bragg grating (FBG) connected to the first and second sections by an amount larger than a predetermined operational range of the first FBG;
   operatively attaching a second fiber Bragg grating (FBG) to the first FBG and the mount; and removing bridging portions connecting the first and second sections after the mount is operatively attached to the host structure;

wherein a right-side failure proof feature is provided by detecting whether a reflection wavelength reverts to an original Bragg wavelength of the first FBG to indicate whether the first FBG has broken.

18. The strain gauge according to claim 1, wherein the first FBG is covered by a waterproof resilient glue such as silicone glue to protect the first FBG from moisture and to dampen the first FBG to avoid sideways oscillations.

19. The strain gauge according to claim 1, wherein the void is located at a middle portion of the mount.

* * * * *